(12) United States Patent
Hwang et al.

(10) Patent No.: US 9,841,532 B2
(45) Date of Patent: Dec. 12, 2017

(54) METHOD FOR ANALYZING 2-DIMENSIONAL GEOTHERMAL RESOURCE DATA USING WEB-BASED 3-DIMENSIONAL SECTIONAL VIEW

(71) Applicant: Korea Institute of Geoscience and Mineral Resources, Daejeon (KR)

(72) Inventors: Jaehong Hwang, Daejeon (KR); Hyoung chan Kim, Daejeon (KR)

(73) Assignee: KOREA INSTITUTE OF GEOSCEINCE & MINERAL RESOURCES, Daejeon (KR)

( * ) Notice: Subject to any disclaimer, the term of this patent is extended or adjusted under 35 U.S.C. 154(b) by 407 days.

(21) Appl. No.: 14/564,590

(22) Filed: Dec. 9, 2014

(65) Prior Publication Data
US 2016/0084988 A1   Mar. 24, 2016

(30) Foreign Application Priority Data
Sep. 24, 2014 (KR) .......................... 10-2014-0127597

(51) Int. Cl.
*G01V 99/00* (2009.01)
*G01V 9/00* (2006.01)

(52) U.S. Cl.
CPC ............ *G01V 99/005* (2013.01); *G01V 9/005* (2013.01)

(58) Field of Classification Search
CPC .......... H04L 51/04; H04L 41/12; G06Q 50/01
USPC ............................. 702/2; 705/14.53; 455/423
See application file for complete search history.

(56) References Cited

U.S. PATENT DOCUMENTS

| | | | |
|---|---|---|---|
| 2011/0275364 A1* | 11/2011 | Austin | H04L 41/12 455/423 |
| 2013/0073387 A1* | 3/2013 | Heath | G06Q 30/02 705/14.53 |
| 2015/0323699 A1* | 11/2015 | Gariepy | H04L 51/04 702/2 |

FOREIGN PATENT DOCUMENTS

| | | |
|---|---|---|
| KR | 10-0750749 A | 8/2007 |
| KR | 10-0836235 B1 | 6/2008 |
| KR | 10-1047859 | 7/2011 |
| KR | 10-1102812 | 12/2011 |

* cited by examiner

*Primary Examiner* — Bo Fan
(74) *Attorney, Agent, or Firm* — Dentons US LLP

(57) ABSTRACT

Disclosed herein is a method for analyzing 2-dimensional geothermal resource data using a web-based 3-dimensional sectional view, to implement an analyzing module performing 3-dimensional section analysis for 2-dimensional geothermal resource spatial data as a program run by data processing devices including a computer. The method for analyzing 2-dimensional geothermal resource data using a web-based 3-dimensional sectional view is configured by the processes of: selecting an analysis target region and generating linear vector data; requesting a section analysis layer of GeoServer for the target region; generating a dynamic query for a section analysis according to the delivered conditions, and executing PostGIS, an open source GIS software; delivering a result of the sectional view analysis executed by PostGIS to OpenLayers, and generating a section analysis results chart to display it on the Web; and displaying the sectional view analysis chart as a pop-up window.

8 Claims, 6 Drawing Sheets

METHOD FOR ANALYZING 2-DIMENSIONAL GEOTHERMAL RESOURCE DATA USING WEB-BASED 3-DIMENSIONAL SECTIONAL VIEW

CROSS-REFERENCE TO RELATED APPLICATION

This application claims priority to Korean Patent Application No. 2014-0127597 filed on Sep. 24, 2014 and all the benefits accruing therefrom under 35 U.S.C. §119, the contents of which are incorporated by reference in their entirety to the extent permitted by law.

BACKGROUND OF THE INVENTION

The present invention relates, generally, to a method for analyzing geothermal resource data and, more particularly, to a method for analyzing 2-dimensional geothermal resource data using a web-based 3-dimensional sectional view to implement an analyzing module as a program run by data processing devices including a computer; the analyzing module being configured to perform a 3-dimensional section analysis for 2-dimensional geothermal resource spatial data using geothermal resource data such as: a geothermal heat flow map, a geothermal gradient map, a geothermal distribution-at-depth map, and the like, obtained by synthesizing geothermal heat flow data calculated from measuring geothermal gradient and thermal conductivity of rocks in a specific region.

Also, the present invention, to implement the 3-dimensional section analyzing module for 2-dimensional geothermal resource spatial data as a program run on the Web as described above, relates to a method for analyzing 2-dimensional geothermal resource data using a web-based 3-dimensional sectional view, configured by the processes of: selecting a target region for analysis on a map screen on the Web, and generating linear vector data for the region; requesting a section analysis layer of GeoServer for the target region based on the generated linear vector data and a distribution map; generating a dynamic query for the section analysis depending on the conditions delivered from the GeoServer, and executing PostGIS, which is an open source based-geographic information software; delivering a result of the sectional view analysis executed by PostGIS to OpenLayers, and generating a chart for the results of the section analysis to display it on the Web; and displaying the chart of the sectional view analysis as a form of a pop-up window on the map screen on the Web.

These days, because of the problems like climate change from reckless destruction and exhaustion of fossil fuels such as petroleum or coal, studies on renewable energy are actively progressed. Renewable energy involves using natural energy such as solar power, water power, wind power, geothermal heat, etc., which are eco-friendly alternative energy forms that may replace the existing fossil fuels.

In this case, using geothermal heat has an effect on curbing a greenhouse effect and heat islands because it exhausts little gases including $CO_2$, $NO_x$, $SO_x$ in comparison with fuel fossils, and thus may mitigate global warming. Also, supplying natural energy such as solar power, water power, or wind power is generally influenced by meteorological phenomena, while geothermal energy is rarely influenced by meteorological phenomena, therefore it has a high reliability in terms of supply.

In detail, geothermal heat is the energy that the earth has, including hot water and rocks, extending in from the surface of the earth to depths of several kilometers. About 47% of solar heat is stored underground through the surface of the earth. Temperatures of the interior of the earth absorbing the solar heat are different according to the topography, but the temperature of the undersurface roughly ranges from 10° C. to 20° C., and the geothermal temperature at the depth of several kilometers ranges from 40° C. to above 150° C. with little variation throughout the year.

Additionally, in Korea, accessing deep geothermal heat reserves is difficult because there are currently no active volcanic regions there. Consequently, a system using geothermal heat at depth from 100 m to 150 m is actively being developed and supplied.

However, the definition of geothermal energy potential is not globally agreed-upon because it is differently defined according to electric generation, district heating or air conditioning using geothermal heat pump. Also, in Korea, quantitative estimation of the geothermal energy resources is difficult.

Accordingly, the present applicant, the Korea Institute of Geoscience and Mineral Resources, has displayed the distribution of geothermal energy by respectively producing a geothermal heat flow map, geothermal gradient map, and geothermal distribution-at-depth map throughout the country, to analyze the distribution of geothermal energy in Korea.

In this case, a geothermal heat flow, which may alternatively be called heat flow of the earth crust, is an amount of energy present from the earth's core to the earth's crust, and it is shown as an amount of energy obtainable from the unit area per unit time, expressed as HFU (Heat Flow Unit, $m \cdot W/m^2$). 1 HFU means that $10^{-6}$ cal of energy comes from the 1 $m^2$ of area during one second.

Also, because the heat flow of the earth crust relates to the stability of the earth's crust, it shows a high value in a tectonic region compared to a stable region. In other words, a heat flow of the earth crust is measured at a high level within a young organic belt or volcanic zone. In the case of continents, it is measured at a high level in organic belts of the Mesozoic and Cenozoic era, which is relatively close to the present, while it is measured at a low level in shields. In case of the ocean, it is high in oceanic ridges and decreases as the distance therefrom increases, being at its lowest in oceanic trenches.

Additionally, the geothermal gradient is the rate of increasing temperature with respect to increasing depth beneath the earth's crust. In other words, a high geothermal gradient means that geothermal heat is much higher with increasing depth, and it generally shows 20° C. to 30° C. per 1 km, but it may show 50° C. in high temperature zones, for example an active volcanic region.

A direct method of measurement for a geothermal gradient is digging a well in the surface of the earth and measuring the temperature of the interior of the well. Additionally, a mine or petroleum well is also used for the same object. Another method is implemented in the laboratory by measuring heat flux and thermal conductivity from one point on the earth's surface (mostly on the ocean floor), and estimating geothermal gradient according to the measurement.

Furthermore, geothermal distribution-at-depth shows geothermal temperature at the surface of the earth or geothermal distribution at the specific depth.

Accordingly, data synthetically estimating a heat flow of the earth's crust, geothermal gradient, and geothermal distribution-at-depth is used for evidentiary materials to select a proposed site for geothermal energy development. However, a method or system to effectively analyze the geothermal distribution has not been provided.

More specifically, a geothermal heat flow map, geothermal gradient map, and geothermal distribution-at-depth map as described above are just 2-dimensional data. Therefore, to establish a 3-dimensional sectional view that shows geothermal distribution according to depth in the specific region, it is necessary to search for many geothermal maps per depth in the specific region; to synthesize and analyze the respective geothermal maps; and to establish a sectional view.

Consequently, to solve the problems in the prior art as described above, it is desired to provide a spatial data analyzing system for geothermal resources, configured to make a program automatically execute the processes of: aggregating and analyzing existing geothermal resource data for a region when a user inputs the region for analysis; and establishing a 3-dimensional sectional view for geothermal distribution, using a means of data processing including a computer. But, such a device or method has not been provided yet.

SUMMARY OF THE INVENTION

Accordingly, the present invention has been made keeping in mind the above problems occurring in the prior art, and an object of the present invention is to provide a method for analyzing 2-dimensional geothermal resource data using a web-based 3-dimensional sectional view, to implement an analyzing module as a program run by data processing devices including a computer to avoid inconvenience due to the processes of searching for a lot of geothermal maps per depth in a specific region, synthesizing and analyzing them, and generating a sectional view. The analyzing module may perform a 3-dimensional section analysis of 2-dimensional geothermal resource spatial data using geothermal resource data such as a geothermal heat flow map, geothermal gradient map, geothermal distribution-at-depth map, and the like, which is obtained by integrating geothermal heat flow data from measuring and calculating geothermal gradient and thermal conductivity of rocks in a specific region.

Also, another object of the present invention is, in order to implement the 3-dimensional section analyzing module for 2-dimensional geothermal resource spatial data as a program run on the Web as described above, to provide a method for analyzing 2-dimensional geothermal resource data using a web-based 3-dimensional sectional view, configured to include the processes of: selecting a target region for analysis on a map screen on the Web, and generating linear vector data for the region; requesting a section analysis layer of the GeoServer for the target region based on the generated linear vector data and a distribution map; generating a dynamic query for the section analysis depending on the conditions delivered from the GeoServer, and executing PostGIS, which is an open source based-geographic information software; delivering a result of the sectional view analysis executed by the PostGIS to the OpenLayers, and generating a chart for the results of the section analysis to display it on the Web; and displaying the chart of the sectional view analysis as a form of a pop-up window on the map screen on the Web.

In order to accomplish the above object, the present invention provides a method for analyzing 2-dimensional geothermal resource data using a web-based 3-dimensional sectional view to implement an analyzing module, which may perform a 3-dimensional section analysis for 2-dimensional geothermal resource spatial data, as a program run on the Web by data processing devices including a computer. The method is configured to include: selecting, by a user, a type of geothermal map and a target region to analyze on a map screen on the Web; generating linear vector data for the analysis target region by a first processing unit when the type of geothermal map and analysis target region are selected; requesting a section analysis layer for the analysis target region from a second processing unit based on the linear vector data generated by the first processing unit and the selected type of geothermal map; generating a dynamic query for a section analysis by the second processing unit according to conditions delivered from the step of requesting, and performing a sectional view analysis by a third processing unit; delivering a result of the sectional view analysis performed by the third processing unit to the first processing unit; generating a sectional view analysis chart to display on the Web screen by the first processing unit, using the results of the sectional view analysis; and displaying the sectional view analysis chart as a form of pop-up window on the map screen on the Web.

The first processing unit is configured using OpenLayers that is an open library for displaying data on the map in a web browser, and the second processing unit is configured using GeoServer that is an open source GIS (Geographic Information System) software server developed in Java to share and edit geospatial data. The third processing unit is configured using PostGIS that is an open source software package for building a spatial DBMS (Data Base Management System) which collects and processes data related to geography using GIS (Geographic Information System) to be used in the related fields.

Also, the step of selecting type of geothermal map and target region to analyze is configured such that a distribution map selection window is displayed on one side of the screen to enable the user to select a distribution map to analyze in terms of either geothermal distribution-at-depth or geothermal potentials-at-depth; and a process to enable the user to designate the target region to analyze by drawing a line on the map is performed when the user clicks a button for designating a region.

Additionally, the step of generating linear vector data for the analysis target region includes: an analysis for a raster for an intersection portion between raster and vector data; and an analysis for a distance of vector data for the intersection portion between the raster and vector data;

Furthermore, the analysis for a raster is configured by the processes of: determining using ST_Intersects function if a first raster data, which corresponds to a map displayed on a screen, intersects with vector data, which corresponds to a line drawn on the map by a user to select an analysis target region; extracting an intersection portion using ST_Clip function; rasterizing the extracted portion into a second raster data using ST_DumpAsPolygons function; and extracting a value of a geometrical object for the second raster data using geomval function.

Also, the analysis for a distance is configured by the processes of: determining using ST_Intersects function if a first raster data, which corresponds to a map displayed on a screen, intersects with vector data, which corresponds to a line drawn on the map by a user to select an analysis target region; extracting an intersection portion using ST_Clip function; rasterizing the extracted portion into a second raster data using ST_DumpAsPolygons function; extracting a value of a geometrical object for the second raster data using geomval function; extracting a center point of the geometrical object (Center Geometry) using ST_Centroid function; extracting a floating-point number between 0 to 1 which indicates the closest location on the vector data to the center point using ST_LineLocatePoint function; and obtaining a distance of the intersection portion by multiplying the floating-point number by a whole distance of the vector data using ST_LineLocatePoint and ST_Length functions.

Additionally, the step of requesting is configured to execute a GeoServer requesting method in the OpenLayers according to the conditions of the line drawn on the map and selected type of map, which are determined in the step of selecting.

Furthermore, the step of performing a sectional view analysis is configured by the processes of: dynamically generating a SQL query to execute the PostGIS using conditions delivered by the OpenLayers; and obtaining a distance (line_distance) and raster value (temp_value) of an intersection portion between the raster and vector data by making the PostGIS execute the query.

Also, the step of delivering is configured to deliver the distance (line_distance) and raster value (temp_value) of the intersection portion between the raster and vector data to the OpenLayers, the distance (line_distance) and raster value (temp_value) being obtained as a result of the sectional view analysis and received by the GeoServer.

Furthermore, the step of generating a sectional view analysis chart is configured to execute a method that generates a sectional view analysis chart by the OpenLayers using the results of the sectional view analysis delivered in the step of delivering.

Additionally, the step of displaying is configured to display the sectional view analysis chart generated by the OpenLayers as a form of pop-up window on the map screen.

Also, the present invention, using the method for analyzing 2-dimensional geothermal resource data using a web-based 3-dimensional sectional view, provides a geothermal resource data analyzing system configured to perform a 3-dimensional analysis of the geothermal resource data for an analysis target region using 2-dimensional geothermal map data.

As described above, the present invention provides a method for analyzing 2-dimensional geothermal resource data using a web-based 3-dimensional sectional view configured to include: selecting a target region for analysis on a map screen on the Web, and generating linear vector data for the region; requesting a section analysis layer of GeoServer for the target region based on the generated linear vector data and a distribution map; generating a dynamic query for the section analysis depending on the conditions delivered from the GeoServer, and executing PostGIS, which is an open source based-geographic information software; delivering a result of the sectional view analysis executed by PostGIS to OpenLayers, and generating a chart for the results of the section analysis to display it on the Web; and displaying the chart of the sectional view analysis as a form of a pop-up window on the map screen on the Web. Accordingly, the present invention may solve the problems in the prior art, which is inconvenience from passing through the processes of searching for a lot of geothermal maps per depth in the specific region, synthesizing and analyzing them, and generating a sectional view, to generate a 3-dimensional sectional view showing the geothermal distribution with depth in the specific region.

Also, according to the present invention, by providing a method for analyzing 2-dimensional geothermal resource data using a web-based 3-dimensional sectional view, an analyzing system may be implemented as a program run by data processing devices including a computer, the analyzing system being configured to perform a 3-dimensional section analysis for 2-dimensional geothermal resource spatial data, using geothermal resource data such as a geothermal heat flow map, geothermal gradient map, geothermal distribution-at-depth map, and the like, obtained by synthesizing geothermal heat flow data calculated from measuring geothermal gradient and thermal conductivity of rocks in a specific region.

DESCRIPTION OF THE PRESENTLY PREFERRED EMBODIMENTS

Concrete embodiment of the method for analyzing 2-dimensional geothermal resource data using a web-based 3-dimensional sectional view will be disclosed referring to the accompanying drawings as the following.

The following description is one embodiment of the present invention, and is not to be construed as the limit of the present invention.

Also, in the following description of the embodiment of the present invention, detailed information may be omitted to simplify the description on the assumption that the information is the same or similar to the prior art or easily understood and implemented by those skilled in the art.

In other words, the present invention, as described later, relates to a method for analyzing 2-dimensional geothermal resource data using a web-based 3-dimensional sectional view to implement an analyzing module as a program run by data processing devices including a computer, to avoid inconvenience due to the processes of searching for a lot of geothermal maps per depth in a specific region, synthesizing and analyzing them, and generating a sectional view. The analyzing module may perform a 3-dimensional section analysis of 2-dimensional geothermal resource spatial data using geothermal resource data such as a geothermal heat flow map, geothermal gradient map, geothermal distribution-at-depth map, and the like, which is obtained by integrating geothermal heat flow data from measuring and calculating geothermal gradient and thermal conductivity of rocks in a specific region.

Also, the present invention, in order to implement the 3-dimensional section analyzing module for 2-dimensional geothermal resource spatial data as a program run on the Web, relates to a method for analyzing 2-dimensional geothermal resource data using a web-based 3-dimensional sectional view, configured to include the processes of: selecting a target region for analysis on the map screen on the Web, and generating linear vector data to the region; requesting a section analysis layer of GeoServer for the target region based on the generated linear vector data and a distribution map; generating a dynamic query for the section analysis depending on the conditions delivered from the GeoServer, and executing PostGIS, which is an open source based-geographic information software; delivering a result of the sectional view analysis executed by the PostGIS to the OpenLayers, and generating a chart for the results of the section analysis to display it on the Web; and displaying the chart of the sectional view analysis as a form of a pop-up window on the map screen on the Web.

Subsequently, a specific configuration of the method for analyzing 2-dimensional geothermal resource data using a web-based 3-dimensional sectional view will be described referring to the drawings.

Figure 1:
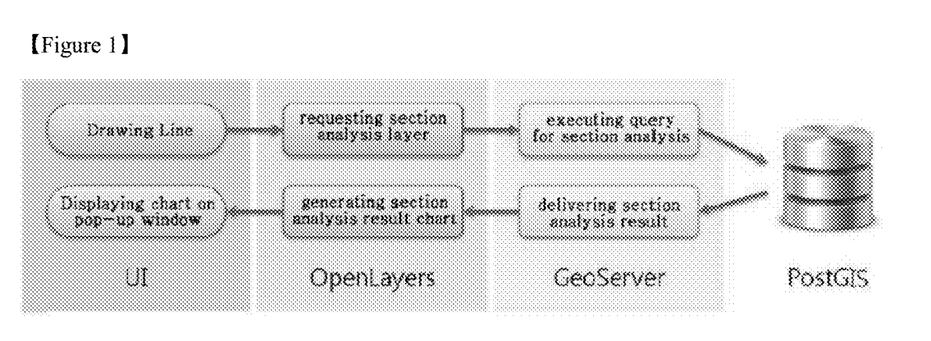
FIG. 1 is a simplified plan illustrating the overall configuration of a method for analyzing 2-dimensional geothermal resource data using a web-based 3-dimensional sectional view according to an embodiment of the present invention.
Figure 2:
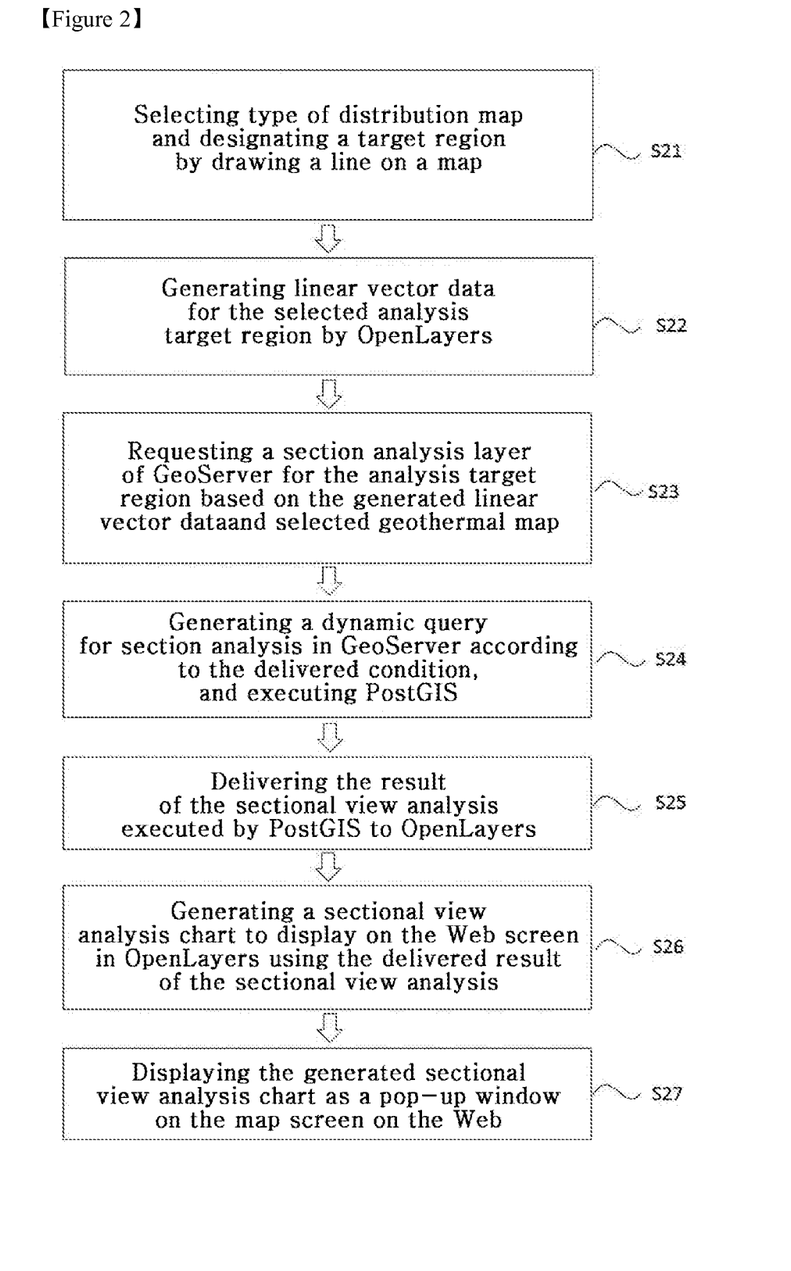
FIG. 2 is a flowchart illustrating the overall configuration of a method for analyzing 2-dimensional geothermal resource data using a web-based 3-dimensional sectional view according to an embodiment of the present invention.

Referring to FIGS. 1 and 2, FIG. 1 simply illustrates the overall configuration of a method for analyzing 2-dimensional geothermal resource data using a web-based 3-dimensional sectional view according to an embodiment of the present invention, and FIG. 2 is a flowchart to illustrate the overall configuration of the method for analyzing 2-dimensional geothermal resource data using a web-based 3-dimensional sectional view according to an embodiment of the present invention.

As shown in FIGS. 1 and 2, a method for analyzing 2-dimensional geothermal resource data using a web-based 3-dimensional sectional view according to an embodiment of the present invention is largely divided into the following steps. First, when a user has selected type of geothermal map to analyze and a target region by drawing a line on the map screen on the Web (S21), linear vector data for the selected target region is generated by OpenLayers (S22), and a section analysis layer of GeoServer for the target region is called based on the generated linear vector data and selected geothermal map (S23).

Subsequently, GeoServer generates a dynamic query for a section analysis according to the delivered condition, executes PostGIS (S24), and delivers a result of the sectional view analysis executed by PostGIS to OpenLayers (S25).

Subsequently, OpenLayers generates a sectional view analysis chart using the delivered result of the sectional view analysis to display it on the Web screen (S26), and displays the sectional view analysis chart as a pop-up window on the map screen on the Web (S27).

In this case, GeoServer applied to the embodiment of the present invention, is an open source based-GIS software server developed in Java to share and edit geospatial data. As GeoSever designed for interoperability uses open standards, it may provide various geospatial data sources.

Also, the PostGIS mentioned above is an open source software package involved in building a geospatial DBMS (Data Base Management System) that collects geography-related data using GIS (Geographic Information System) and processes it, to be used in the related fields.

Additionally, GIS refers to an integrated information system that generates and manages maps and geographical information, which were provided in a form of printed matter, using a computer, and it is designed to collect, analyze, and process data based on the geographical information in order to apply the data to all the fields related to geography. Concretely, it is used in a wide range of fields and applications including land, resource, environment, city, ocean, fishery, military, transportation, communication, water and sewage, etc., Furthermore, OpenLayers described above is a pure JavaScript library for displaying various data on a map in the web browser, and supports the standards defined by OGC (Open Geospatial Consortium), an International standards organization for spatial data industry. OpenLayers is an open source library used for implementing a map of WMS, WFS, ArcGIS, Google, Yahoo, etc. in the client side of the Web environment.

In other words, the present invention intends to implement a geothermal resource data analyzing system as a program running on the Web to provide a geothermal distribution at depth in a specific region as a form of 3-dimensional graphical data based on the existing 2-dimensional geothermal maps, using the open source Internet GIS server: GeoServer, the open source based-geospatial DBMS: PostGIS, and OpenLayers, which is an open source library.

In more detail, the step of generating linear vector data for the analysis target region (S22) may include a raster analyzing process for an intersection portion between raster and vector data; and an analyzing process for a distance of vector data for an intersection portion between the raster and vector data.

Figure 3:
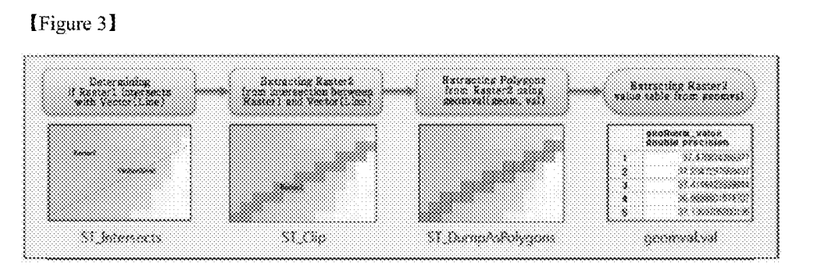
FIG. 3 is a plan illustrating a raster analyzing process for an intersection portion between raster and vector data.

Referring to FIG. 3, FIG. 3 illustrates a raster analyzing process for an intersection portion between raster and vector data.

As shown in FIG. 3, a raster analyzing process for an intersection portion between raster and vector data is configured by: determining if raster data (Raster1, that is, a map displayed on the screen) intersects with vector data (a line drawn by a user on the screen to designate an analysis target region); clipping the intersection portion and rasterizing it (Raster2); and extracting a value of the geometrical object (Raster2) from geomval.

In this case, functions for the raster analysis process are ST_Intersects, ST_Clip, ST_DumpAsPolygons, and geomval. First, ST_Intersects returns TRUE if the Geometry/

Geography objects spatially intersect in 2D (share any portion of space) and FALSE if they do not (they are non-intersecting).

Also, for Geography object, tolerance is 0.00001 meters (so any points in that tolerance are considered to intersect). ST_Clip crops the input vector polygon using spatial operations. That is, when a raster is overlapped by the input vector polygon, ST_Clip clips an intersection portion shared by the vector polygon and raster, and converts the intersection portion to a raster.

In this case, if no band is specified, all bands are returned. Also, if the generated raster is not specified, TRUE means that the output raster is cropped to the intersection.

Also, ST_DumpAsPolygons returns a given raster band, a set of geomval (geom,val) rows. If bandnum is not specified, bandnum defaults to 1.

Furthermore, geomval function is a spatial data type with two fields, geom (holding a geometrical object) and val (holding a double precision pixel value from a raster band).

In this case, if a query for a sectional view is planned like the following Q1, which exports a result using geomval (geom, val) from the intersected raster, it takes 17627 ms for analysis, and causes a problem in speed.

Consequently, the present embodiment solves the problem in speed by processing a query like the following Q2. It takes 1553 ms for analysis, and it proceeds 10 times faster than Q1 in searching.

Q1: (ST_intersection(line_geometry, rast, 1).val AS geotherm1 km_value

Q2: (ST_DumpAsPolygons(ST_Clip(rast, 1, line_geometry, true))).val AS goethermlkm_value Also, to optimize a spatial query for a raster value for a sectional view analysis, it is required to determine if line_geometry intersects with rast using ST_Intersects; to obtain a raster from the intersection portion using ST_Clip; to convert the raster to geomval (a geometrical object) using ST_DumpAsPolygons; and to get a raster value from geomval (a geometrical object), like the following query.

Figure 4:
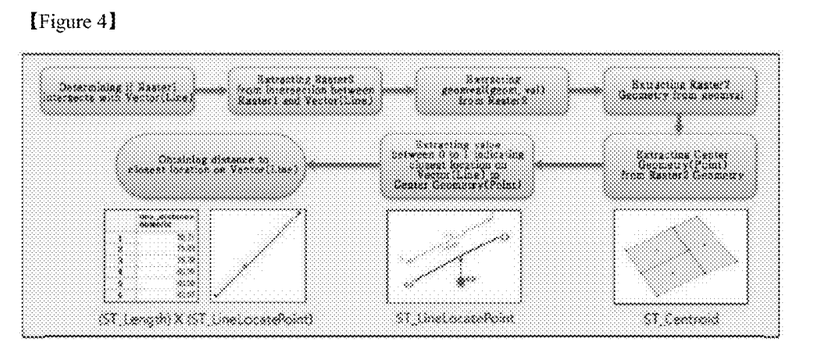
FIG. 4 is a plan illustrating an analyzing process for a distance of the vector data for an intersection portion between raster and vector data.

SELECT
( ST_DumpAsPolygons( ST_Clip(rast, 1, line_geometry, true) ) ).val AS geotherm1km_value
FROM geotherm1km
 , ST_GeomFromText('LINESTRING(502802.3694219616
4000591.8319542767, 491940.98535695201 3939043.9823460358
 , 428165.16041461495 3908130.8095224891)', 32652) AS line_geometry
WHERE ST_Intersects(line_geometry, rast, 1);

Subsequently, FIG. 4 illustrates an analyzing process for a distance of vector data for an intersection portion between raster and vector data.

As shown in FIG. 4, distance (km) analysis for an intersection portion between raster and vector data is processed by: determining if rater data (Raster1) intersects with vector data (Line); rasterizing the intersection portion (Raster2) and extracting geomval (a geometrical object, Raster2 Geometry); obtaining a center point of the geometrical object from the extracted geomval; extracting a floating-point number between 0 to 1 that shows the location of the closest point on the vector data (Line) to the center point; and obtaining a distance of the intersection portion by multiplying the floating-point number by the whole distance of the vector data (Line).

In this case, functions for the distance analysis are ST_Centroid, ST_LineLocatePoint, ST_Length, and ST_GeomFromText. First, ST_Centroid returns the geometric center of Geometry (the center of mass of the geometry), and implements the SQL/MM specification expressed in SQL-MM 3: 8.1.4, 9.5.5.

Also, ST_LineLocatePoint returns a floating-point number between 0 and 1 (a fraction of total 2D line length) representing the location of the closest point on LineString to the given Point Geometry, and ST_Length returns the 2D length of the Geometry if it is LineString or MultiLineString.

In this case, Geometry type uses units of spatial reference system, and Geography type uses units in meters (default spheroid). Also, ST_GeomFromText returns a specified ST_Geometry value from Well-Known Text representation (WKT).

Furthermore, a spatial query to calculate a distance of an intersection portion between raster and vector data may be optimized by the processes of: determining using ST_Intersects if line_geometry intersects with rast; obtaining a raster from the intersection portion using ST_Clip; converting the raster into geomval (a geometrical object) using ST_DumpAsPolygons; obtaining a center point of the geometrical object from geomval using ST_Centroid; obtaining a floating-point number between 0 to 1 that shows the location of the closest point on the vector data to the center point; and obtaining a distance of the intersection portion by multiplying the floating-point number by the whole distance of the vector data, as shown in the following.

Figure 5:
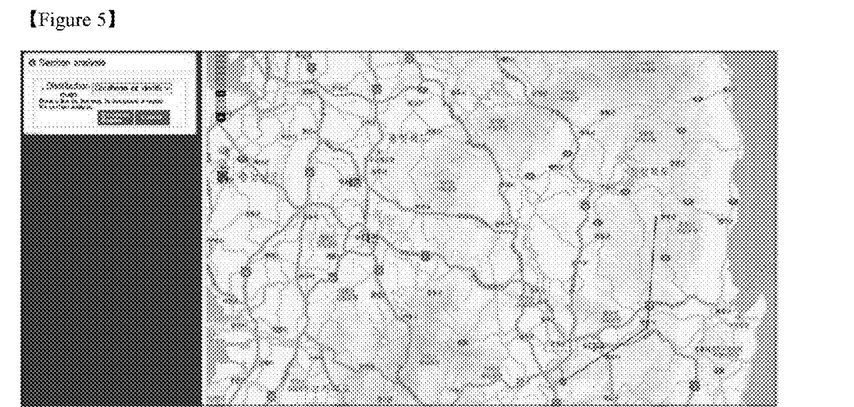
FIG. 5 illustrates that a user selects type of geothermal map on the map screen on the Web and designates a target region by drawing a line on the map, in a implementation of a method for analyzing 2-dimensional geothermal resource data using a web-based 3-dimensional sectional view according to an embodiment of the present invention.

SELECT
  ROUND( CAST( ( ST_Length(line_geometry} *
    ST_LineLocatePoint( line_geometry,
      ST_Centroid( (ST_DumpAsPolygons( ST_Clip(rast, 1,
        line_geometry, true) )).geom ) )
/ 1000) AS numeric), 2) AS line_distance
FROM geotherm1km
  , ST_GeomFromText('LINESTRING(502802.3694219616
4000591.8319542767, 491940.98535695201 3939043.9823460858
      , 428165.16041461495 3908130.8095224S91)', 32652) AS line_geometry
WHERE ST_Intersects(line_geometry, rast, 1);

Subsequently, FIG. 5 is a map screen on the Web from implementing a method for analyzing 2-dimensional geothermal resource data using a web-based 3-dimensional sectional view according to an embodiment of the present invention. FIG. 5 shows a process in which a user selects type of geothermal map to analyze and designates a target region by drawing a line on the map.

As shown in FIG. 5, a user selects a distribution map to analyze in terms of either geothermal distribution-at-depth or geothermal potentials-at-depth using a distribution map selection window shown in the left side of FIG. 5, and when a user click a button for designating a target region, a process that enables the user to draw a line on the map is carried out.

Accordingly, as shown in the right side of FIG. 5, when a user draws a line on the region to analyze and double-clicks it, a sectional view analysis begins from performing the step of generating linear vector data for the analysis target region (S22) as described above.

Figure 6:
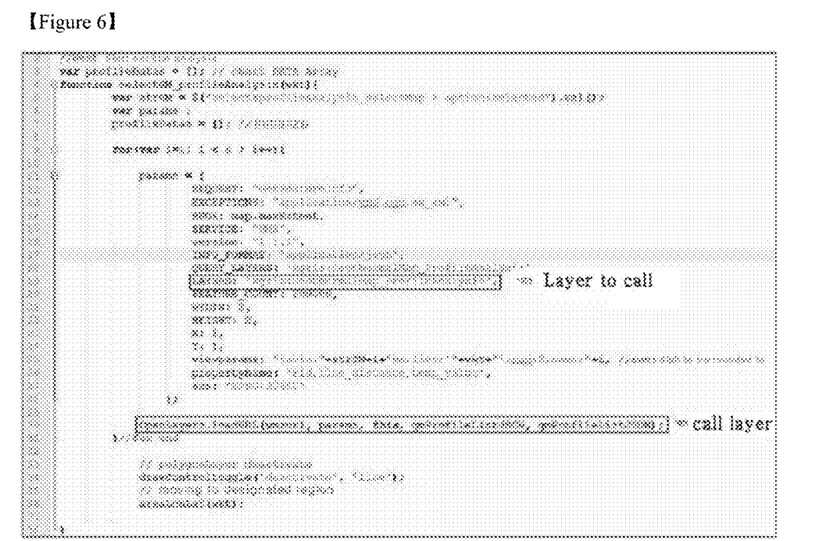
FIG. 6 illustrates a configuration for a process to call a section analysis layer of GeoServer for an analysis target region in a method for analyzing 2-dimensional geothermal resource data using a web-based 3-dimensional sectional view according to an embodiment of the present invention.

Subsequently, FIG. 6 illustrates a configuration for a process to call a section analysis layer of GeoServer for an analysis target region in a method for analyzing 2-dimensional geothermal resource data using a web-based 3-dimensional sectional view according to an embodiment of the present invention.

As shown in FIG. 6, the step of requesting a section analysis layer of GeoServer for an analysis target region (S23) includes: writing a statement to call GeoServer on conditions of the line drawn on the map of the UI screen and the distribution map to analyze; and executing the Geoserver requesting method in OpenLayers.

Figure 7:
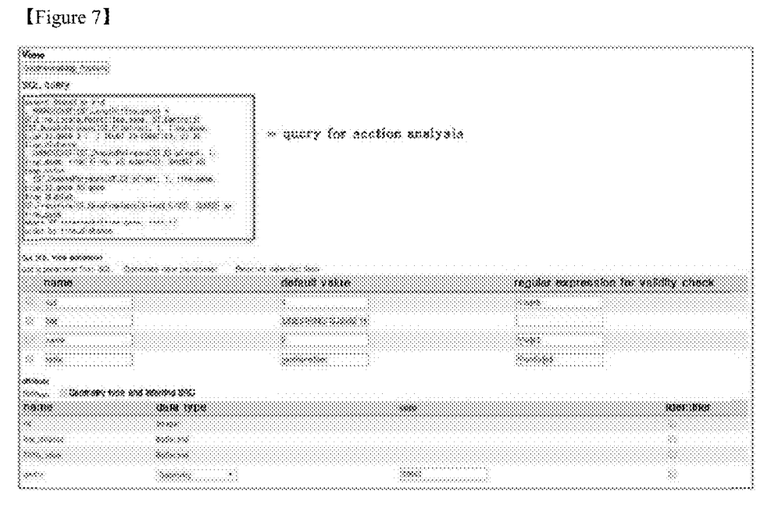
FIG. 7 illustrates a configuration for a process to generate a dynamic query for a section analysis and to execute PostGIS in a method for analyzing 2-dimensional geothermal resource data using a web-based 3-dimensional sectional view according to an embodiment of the present invention.

Subsequently, FIG. 7 illustrates a configuration for a process to generate a dynamic query for a section analysis and to execute PostGIS in a method for analyzing 2-dimensional geothermal resource data using a web-based 3-dimensional sectional view according to an embodiment of the present invention.

As shown in FIG. 7, execution of the query for a section analysis is processed by dynamically generating SQL query to execute PostGIS using table (indicating the distribution map to analyze) and line (indicating the line drawn on the map), which are conditions delivered from OpenLayers; and making PostGIS process the query.

Figure 8:
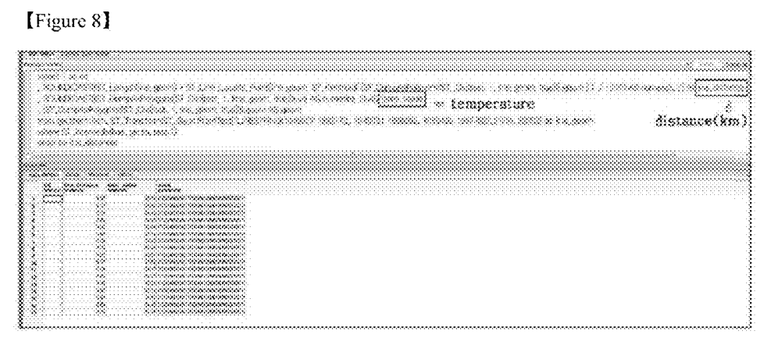
FIG. 8 illustrates a configuration for a process to deliver a result of a sectional view analysis executed by PostGIS to OpenLayers in a method for analyzing 2-dimensional geothermal resource data using a web-based 3-dimensional sectional view according to an embodiment of the present invention.

Subsequently, FIG. 8 illustrates a configuration for a process to deliver a result of a sectional view analysis executed by PostGIS to OpenLayers in a method for analyzing 2-dimensional geothermal resource data using a web-based 3-dimensional sectional view according to an embodiment of the present invention.

As shown in FIG. 8, in the step of delivering a result of a sectional view analysis executed by PostGIS to OpenLayers (s25), when a distance (line_distance) and raster value (temp_value) of intersection portion between raster and vector data are gained by making PostGIS execute a query for the sectional view analysis, which is generated by GeoServer, GeoServer receives the resulting values, and delivers them to OpenLayers.

Figure 9:
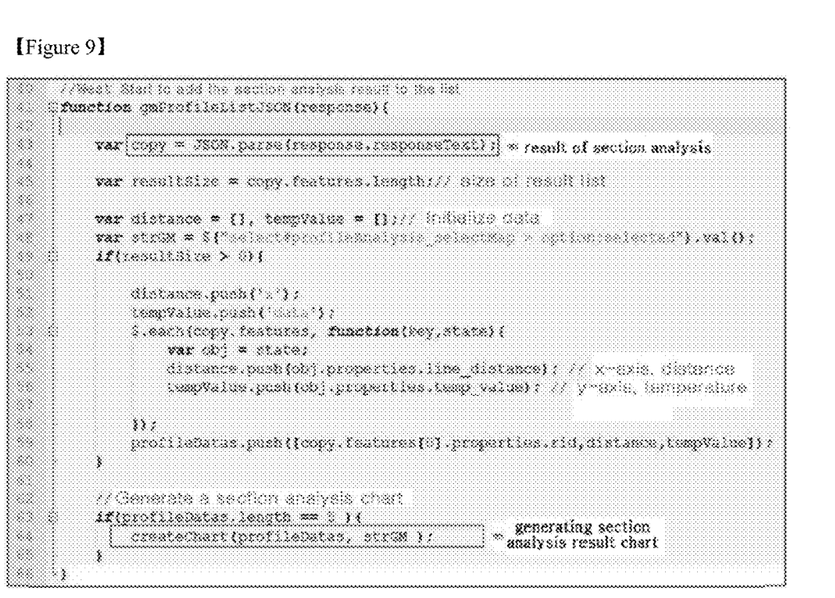
FIG. 9 illustrates a configuration for a process to generate a sectional view analysis chart to display a result of a sectional view analysis on the Web screen in a method for analyzing 2-dimensional geothermal resource data using a web-based 3-dimensional sectional view according to an embodiment of the present invention.

Subsequently, FIG. 9 illustrates a configuration for a process to generate a sectional view analysis chart to display a result of the sectional view analysis on the Web screen in a method for analyzing 2-dimensional geothermal resource data using a web-based 3-dimensional sectional view according to an embodiment of the present invention.

As shown in FIG. 9, the step of generating a sectional view analysis chart to display a result of the sectional view analysis on the Web screen (S26) is configured to make OpenLayers execute a method that generates a sectional view analysis chart using a result of the sectional view analysis, which has been delivered to GeoServer.

Figure 10:
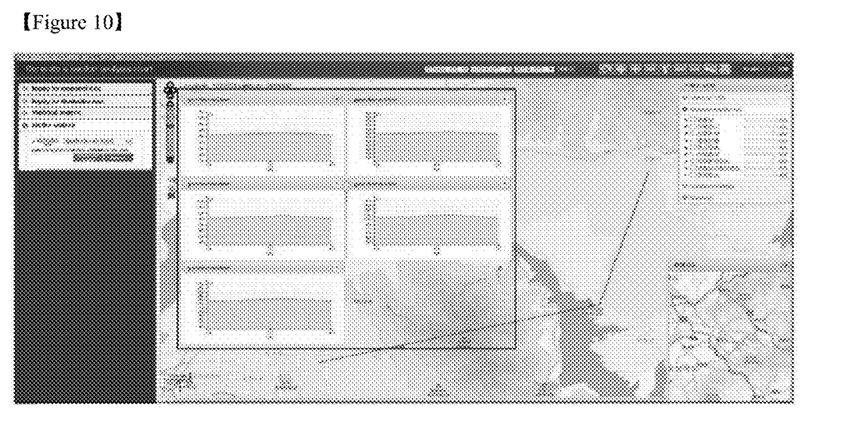
FIG. 10 illustrates a configuration for a process to display a sectional view analysis chart on the map on the Web in a method for analyzing 2-dimensional geothermal resource data using a web-based 3-dimensional sectional view according to an embodiment of the present invention.

Next, FIG. 10 illustrates a configuration for a process to display a sectional view analysis chart on the map on the Web in a method for analyzing 2-dimensional geothermal resource data using a web-based 3-dimensional sectional view according to an embodiment of the present invention.

As shown in FIG. 10, the step of displaying a sectional view analysis chart as a pop-up window on the map screen on the Web (S27) involves displaying the sectional view analysis chart generated by OpenLayers as a form of a pop-up window on the map screen of the Web.

According to the present invention, through the processes described above, 3-dimensional analysis of geothermal resource data like geothermal distribution-at-depth, geothermal potentials-at-depth, etc. for an analysis target region may be easily performed using existing 2-dimensional geothermal maps. Also, an analyzing system to perform 3-dimensional analysis using 2-dimensional data may be simply implemented as a program run on the Web.

Accordingly, by performing the processes described above, a method for analyzing 2-dimensional geothermal resource data using a web-based 3-dimensional sectional view may be implemented.

Also, through implementation of a method for analyzing 2-dimensional geothermal resource data using a web-based 3-dimensional sectional view according to the present invention as described above, a method for analyzing 2-dimensional geothermal resource data using a web-based 3-dimensional sectional view is provided, the method being configured to include: designating a target region for analysis on the map screen on the Web, and generating linear vector data for the target region; requesting a section analysis layer of GeoServer for the target region based on the generated linear vector data and a map; generating a dynamic query for section analysis according to the conditions delivered by GeoServer, and executing PostGIS, which is an open source based GIS software; delivering a result of sectional view analysis executed by PostGIS to OpenLayers, and generating a sectional view analysis chart to display the results on the Web screen; and displaying the sectional view analysis chart as a pop-up window on the map screen on the Web. Also, the method may solve the problem in the prior art, which is passing through the processes of searching for a lot of geothermal maps per depth in a specific region one by one; synthesizing and analyzing the respective distribution maps; and generating a sectional view.

In addition, by providing a method for analyzing 2-dimensional geothermal resource data using a web-based 3-dimensional sectional view according to the present invention, an analyzing system may be implemented as a program run by data processing devices including a computer, the analyzing system performing a 3-dimensional section analysis of 2-dimensional geothermal resource data using geothermal resource data showing geothermal distribution such as geothermal heat flow map, geothermal gradient map, geothermal distribution-at-depth map, etc., obtained by synthesizing geothermal heat flow data calculated from measuring geothermal gradient and thermal conductivity of rocks in a specific region.

Although a method for analyzing 2-dimensional geothermal resource data using a web-based 3-dimensional sectional view has been described in detail through the embodiment, the present invention is not limited by the disclosed embodiment. Accordingly, those skilled in the art will appreciate that various modifications, additions and substitutions are possible, without departing from the scope and spirit of the invention as disclosed in the accompanying claims.

What is claimed is:

1. A method of using 2-dimensional geothermal resource data and generating a web-based 3-dimensional sectional view, comprising the steps of:
presenting on an electronic display, a map and an interactive user interface;
selecting, via a data processing device, a type of geothermal map and a target region of the map to analyze, the step of selecting comprising processing a line drawn on the map by a user via the user interface;
generating linear vector data for the line in the target region by a first processing unit, the first processing unit being configured using an open source library named OpenLayers to display data on the map in a web browser;
requesting a section analysis layer for the target region by a second processing unit based on the linear vector data generated by the first processing unit and the selected type of geothermal map, the second processing unit being an open source geographic information system (GIS) software server module named GeoServer which enables sharing and editing of geospatial data;
generating a dynamic query for a sectional view analysis of the target region according to conditions delivered from the second processing unit, and performing the sectional view analysis by a third processing unit to obtain a linear distance value and a raster value using output from the second processing unit in related fields, the third processing unit comprising an open source software package named PostGIS which is for building a spatial data base management system (DBMS) which collects and processes data related to geography;

delivering a result of the sectional view analysis performed by the third processing unit to the first processing unit;

generating a sectional view analysis chart to display on the electronic display by the first processing unit, using the results of the sectional view analysis; and displaying the sectional view analysis chart on the electronic display, wherein, the step of requesting comprises using a method of the GeoServer module and the OpenLayers library according to the conditions of the line drawn on the map and the selected type of map, the step of delivering comprises delivering the linear distance value and the raster value of an intersection portion between raster data and vector data to the first processing unit, the linear distance value and the raster value being obtained as a result of the sectional view analysis and received by the second processing unit, and the step of generating the section view analysis chart comprises (a) dynamically generating an SQL query to using conditions delivered by the first processing unit and (b) obtaining the linear distance value and the raster value of the intersection portion between the raster data and the vector data by making the third processing unit execute the SQL query.

2. The method of claim 1, wherein the step of selecting the type of geothermal map and the target region comprises:

displaying a distribution map selection window at one side of the electronic display and enabling the user to select a distribution map to analyze in terms of either geothermal distribution-at-depth or geothermal potentials-at-depth, and enabling the user to designate the target region by drawing the line on the map by activating a virtual button for designating a region.

3. The method of claim 2, wherein the step of generating linear vector data for the analysis target region includes:

performing an analysis for the raster for the intersection portion between the raster data and the vector data; and performing an analysis for a distance of the vector data for the intersection portion between the raster data and the vector data.

4. The method of claim 3, wherein the analysis for the raster data comprises:

determining, using an ST_intersects function, if first raster data, which corresponds to the map displayed on electronic display, intersects with the vector data, which corresponds to the line drawn on the map, extracting the intersection portion using an ST_Clip function, rasterizing the extracted intersection portion into second raster data using an ST_DumpAsPolygons function, and extracting a value of a geometrical object for the second raster data using a geomval function, wherein the ST-Intersections, ST-Clip, ST_DumpAsPolygons, and geomval functions are as defined in the PostGIS software package.

5. The method of claim 4, wherein the analysis for the linear distance comprises:

Determining, using the ST_Intersects function, if the first raster data intersects with the vector data, extracting the intersection portion using the ST_Clip function, rasterizing the extracted portion into second raster data using the ST_DumpAsPolygons function, extracting the value of the geometrical object for the second raster data using the geomval function, extracting a center point of the geometrical object (Center Geometry) using a ST_Centroid function, extracting a floating-point number between 0 to 1 that indicates a closest location on the vector data to the center point using a ST_LineLocatePoint function, and obtaining a distance of the intersection portion by multiplying the floating-point number by a whole distance of the vector data using ST_LineLocatePoint and ST_Length functions, wherein, the ST_Centroid function, the ST_LineLocatePoint function, the ST_LineLocatePoint function and the ST_Length function are as defined in the PostGIS software package.

6. The method of claim 5, wherein the step of generating a sectional view analysis chart comprises executing a method that generates a sectional view analysis chart using the OpenLayers library using the results of the sectional view analysis delivered in the step of delivering.

7. The method of claim 6, wherein the step of displaying comprises displaying the sectional view analysis chart in a pop-up window on the electronic display.

8. A geothermal resource data analyzing system including program instructions that when executed cause the system to perform the method of claim 1.

* * * * *